(12) United States Patent
Orlando et al.

(10) Patent No.: US 10,092,133 B2
(45) Date of Patent: Oct. 9, 2018

(54) METHOD FOR MAKING POTS AND PANS, EQUIPPED WITH A MULTI-LAYER COATING OF NON-STICK MATERIAL

(71) Applicant: I.L.L.A. S.p.A., Noceto (PR) (IT)

(72) Inventors: Vincenzo D. Orlando, Parma (IT); Giuliano Costi, Langhirano (IT)

(73) Assignee: I.L.L.A. S.P.A., Noceto (PR) (IT)

( * ) Notice: Subject to any disclaimer, the term of this patent is extended or adjusted under 35 U.S.C. 154(b) by 0 days.

(21) Appl. No.: 15/543,847

(22) PCT Filed: Feb. 4, 2016

(86) PCT No.: PCT/IT2016/000028
§ 371 (c)(1),
(2) Date: Jul. 14, 2017

(87) PCT Pub. No.: WO2016/125199
PCT Pub. Date: Aug. 11, 2016

(65) Prior Publication Data
US 2018/0116447 A1    May 3, 2018

(30) Foreign Application Priority Data
Feb. 6, 2015    (IT) .............. AN2015A0013

(51) Int. Cl.
*B05D 5/08*    (2006.01)
*B05D 7/00*    (2006.01)
(Continued)

(52) U.S. Cl.
CPC ........... *A47J 36/025* (2013.01); *A47J 27/002* (2013.01); *A47J 36/02* (2013.01); *A47J 37/10* (2013.01);
(Continued)

(58) Field of Classification Search
CPC ........ A47J 27/002; A47J 36/02; A47J 36/025; A47J 37/10; B05D 1/02; B05D 1/28;
(Continued)

(56) References Cited

U.S. PATENT DOCUMENTS

| | | | |
|---|---|---|---|
| 8,071,219 B2 | 12/2011 | Berrux et al. | |
| 8,501,289 B2 | 8/2013 | Le Bris et al. | |
| 2011/0180546 A1* | 7/2011 | Le Bris ................. | A47J 36/02 |
| | | | 220/573.2 |

FOREIGN PATENT DOCUMENTS

| | | |
|---|---|---|
| FR | 2904206 A1 | 2/2008 |
| GB | 1247581 A | 9/1971 |

(Continued)

OTHER PUBLICATIONS

International Search Report dated Jul. 5, 2016 for counterpart PCT Application No. PCT/IT2016/000028.

*Primary Examiner* — William P Fletcher, III
(74) *Attorney, Agent, or Firm* — Shuttleworth & Ingersoll, PLC; Timothy Klima

(57) ABSTRACT

A method for making pots and pans, equipped with a multi-layer coating of non-stick material including the forming of multiple layers of coating of an inner surface of a wall delimiting a cooking cavity, performed by cyclical repetition of a step of applying suitable substances and subsequent drying and baking in an oven of said layers of substances applied, at least the final layer of said substances being obtained by using a non-stick substance. The method includes, before the step of applying the substance for forming at least the final layer coating the cooking cavity of the pot, a step of adding as an additive edible oil or grease to the liquid substance to be applied for forming said final layer.

6 Claims, 1 Drawing Sheet

(51) Int. Cl.
    *A47J 36/02*    (2006.01)
    *A47J 27/00*    (2006.01)
    *B05D 3/02*     (2006.01)
    *B05D 1/02*     (2006.01)
    *B05D 1/28*     (2006.01)
    *B05D 1/36*     (2006.01)
    *A47J 37/10*    (2006.01)
    *B05D 1/38*     (2006.01)
    *B05D 7/14*     (2006.01)
    *B05D 7/22*     (2006.01)
    *C09D 7/63*     (2018.01)

(52) U.S. Cl.
    CPC ................ *B05D 1/02* (2013.01); *B05D 1/28* (2013.01); *B05D 1/36* (2013.01); *B05D 1/38* (2013.01); *B05D 3/02* (2013.01); *B05D 3/0254* (2013.01); *B05D 5/08* (2013.01); *B05D 5/083* (2013.01); *B05D 7/14* (2013.01); *B05D 7/22* (2013.01); *B05D 7/582* (2013.01); *B05D 7/584* (2013.01); *B05D 7/586* (2013.01); *C09D 7/63* (2018.01); *B05D 2202/00* (2013.01); *B05D 2401/32* (2013.01)

(58) Field of Classification Search
    CPC ... B05D 1/36; B05D 1/38; B05D 3/02; B05D 3/0254; B05D 5/08; B05D 5/083; B05D 7/14; B05D 7/582; B05D 7/584; B05D 7/586; B05D 7/22; B05D 2202/00; B05D 2401/32; C09D 7/63
    USPC .......................................... 220/573.1, 573.2
    See application file for complete search history.

(56) References Cited

FOREIGN PATENT DOCUMENTS

GB          1247581 A1 *  9/1971
WO     WO2010043826 A2    4/2010

* cited by examiner

METHOD FOR MAKING POTS AND PANS, EQUIPPED WITH A MULTI-LAYER COATING OF NON-STICK MATERIAL

This application is the National Phase of International Application PCT/IT2016/000028 filed Feb. 4, 2016 which designated the U.S. and that International Application was published under PCT Article 21(2) in English.

This application claims priority to Italian Application No. AN2015000013 filed Feb. 6, 2015, which application is incorporated by reference herein.

TECHNICAL FIELD

This invention relates to a method for making non-stick pots and pans.

BACKGROUND ART

The prior art for making non-stick pots and pans involves coating the walls of the cooking cavity of the pots and pans by applying and baking in an oven several successive layers of a substance that has anti-friction properties, known as polytetrafluoroethylene (PTFE).

Before the first use of such pots and pans, some manufacturers recommend that users should grease the PTFE coating by wiping it with a wad of cotton soaked with edible oil.

The purpose of the edible oil is to fill the micro-pores of the layer of PTFE and to increase its non-stick capacity, as well as making it even more impermeable to the foods cooked.

Not all users always grease the pot before use. That may be because of a lack of attention or care, or because of a diet-related choice based on extreme attempts to minimise oil and grease consumption in the preparation of foods, which often is also consistent with the decision to purchase the type of pots and pans which are the subject matter of this invention.

Such an omission is the reason for the disadvantage that may be encountered, consisting of the fact that with repeated use, in the pot which has not been initially prepared as indicated above, the layer of non-stick material tends to see its pores gradually saturated with the absorption and infiltration of cooking fluids that in the medium-/long-term may make cleansing of the pot less and less effective, being able to affect its sanitisation, influence the flavour of the foods, and even the outer quality of the appearance of the non-stick layer.

DISCLOSURE OF THE INVENTION

The technical purpose of this invention is to overcome such disadvantages.

As part of that purpose, the primary aim of the invention is to devise a solution that can be implemented in the pot from the time of its production.

BRIEF DESCRIPTION OF THE DRAWINGS

In accordance with that aim, the solution proposed consists of a production method whose technical features are clearly indicated in the claims herein, and whose advantages are more apparent in the detailed description which follows, with reference to the accompanying drawings, which illustrate a preferred embodiment by way of example only and without limiting the scope of the invention, in which:

PREFERRED EMBODIMENTS OF THE INVENTION

Figure 1:
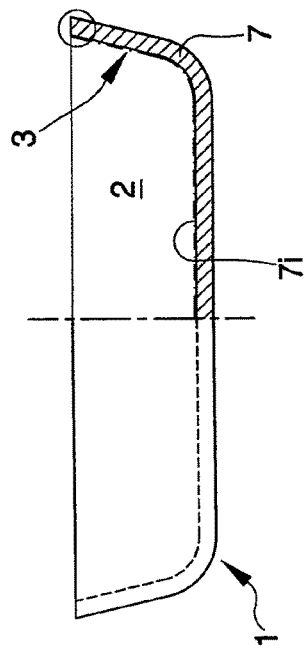
FIG. 1 is a schematic partial cross-section elevation view of a pot.

With reference to the accompanying drawings, in FIG. 1, the numeral 1 denotes a pot of the known type comprising a cooking cavity 2 provided with a thin coating 3 made of non-stick material having its own multi-layer structure.

Figure 2:
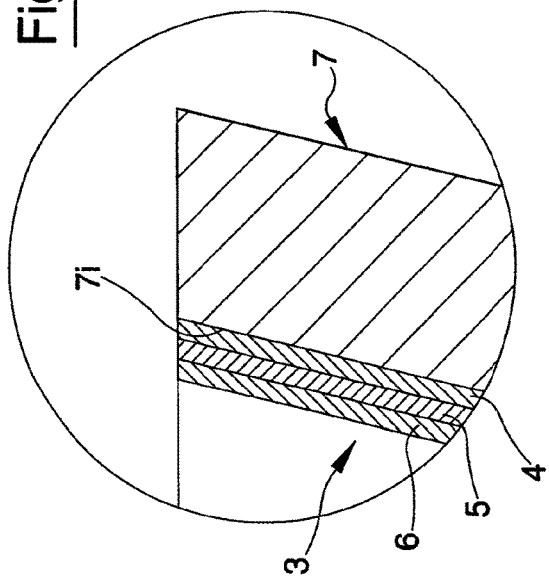
FIG. 2 is an enlarged detail of the pot of FIG. 1.

For the production of such a type of pot or pan equipped with a coating made of non-stick material for the cooking cavity 2, the Applicant applied a production method that comprises forming said coating 3 in multiple layers 4, 5 and 6, which are superposed and applied to the pot 1 one after another [FIG. 2].

Figure 3:
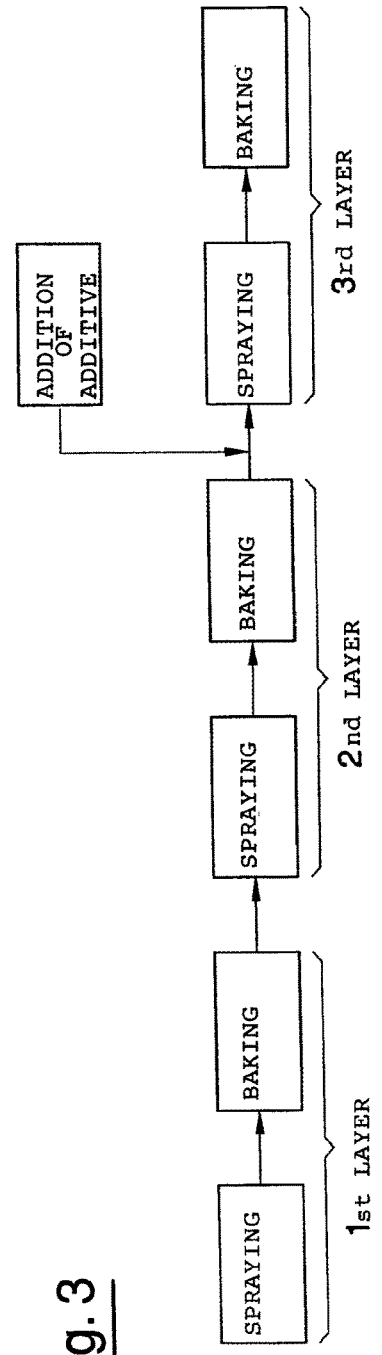
FIG. 3 is a schematic block diagram of several essential steps of a method for making a pot of the type illustrated in FIG. 1.

In practice, the inner surface 7i of the wall 7 of the cooking cavity 2 of the pot 1 is subjected to forming of the coating 3 which comprises [as schematically illustrated in FIG. 3] the cyclical repetition of a step of application of suitable covering substances, and a subsequent drying and baking in an oven of the substance applied, steps that in sequence are repeated several times, each time using the most suitable materials, depending on the number of layers desired for construction of the coating of the inner cavity 2 of the pot 1.

Application of the covering layers may be performed with various methods, which in themselves are known, including, for example but without limiting, spraying or rolling of suitable liquid substances; or even methods for depositing covering powders.

The invention described above is susceptible of evident industrial application. It may also be modified and adapted in several ways without thereby departing from the scope of the appended claims. Moreover, all details of the invention may be substituted by technically equivalent elements.

In accordance with what is indicated above, it may be highlighted, more particularly—and still being explanatory and non-limiting—that the non-stick material used may be of various types, for example it may be plastic as happens when the non-stick material is in the families of polytetrafluoroethylenes (PTFE), or mineral if for example ceramic materials are used. A method for making pots and pans, equipped with a multi-layer coating of non-stick material, can include: forming multiple layers of coating on an inner surface of a wall delimiting a cooking cavity by cyclical repetition of applying covering substances and subsequent drying and baking in an oven the multiple layers; wherein a final layer of the multiple layers includes a non-stick substance; adding edible olive oil to the non-stick substance by mixing in a liquid state before applying the final layer. The method can include adding the olive oil in a weight percentage of between 3% and 8%. The method can include adding the olive oil in a weight percentage of 5%.

The invention claimed is:

1. A method for making pots and pans, equipped with a multi-layer coating of non-stick material, comprising:
    forming multiple layers of coating on an inner surface of a wall delimiting a cooking cavity by cyclical repetition of applying covering substances and subsequent drying and baking in an oven the multiple layers,
    wherein a final layer of the multiple layers includes a non-stick substance;

adding edible olive oil to the non-stick substance by mixing in a liquid state before applying the final layer;

wherein the non-stick substance is a plastic material.

2. The method according to claim 1, and further comprising adding the olive oil in a weight percentage of between 3% and 8%.

3. The method according to claim 2, wherein the plastic material is polytetrafluoroethylene.

4. The method according to claim 2, and further comprising adding the olive oil in a weight percentage of 5%.

5. The method according to claim 4, wherein the plastic material is polytetrafluoroethylene.

6. The method according to claim 1, wherein the plastic material is polytetrafluoroethylene.

* * * * *